Jan. 17, 1939.　　　　　G. A. WUEST　　　　　2,144,281
FRUIT DRAINING AND DRYING APPARATUS
Filed Aug. 24, 1936　　　2 Sheets-Sheet 1
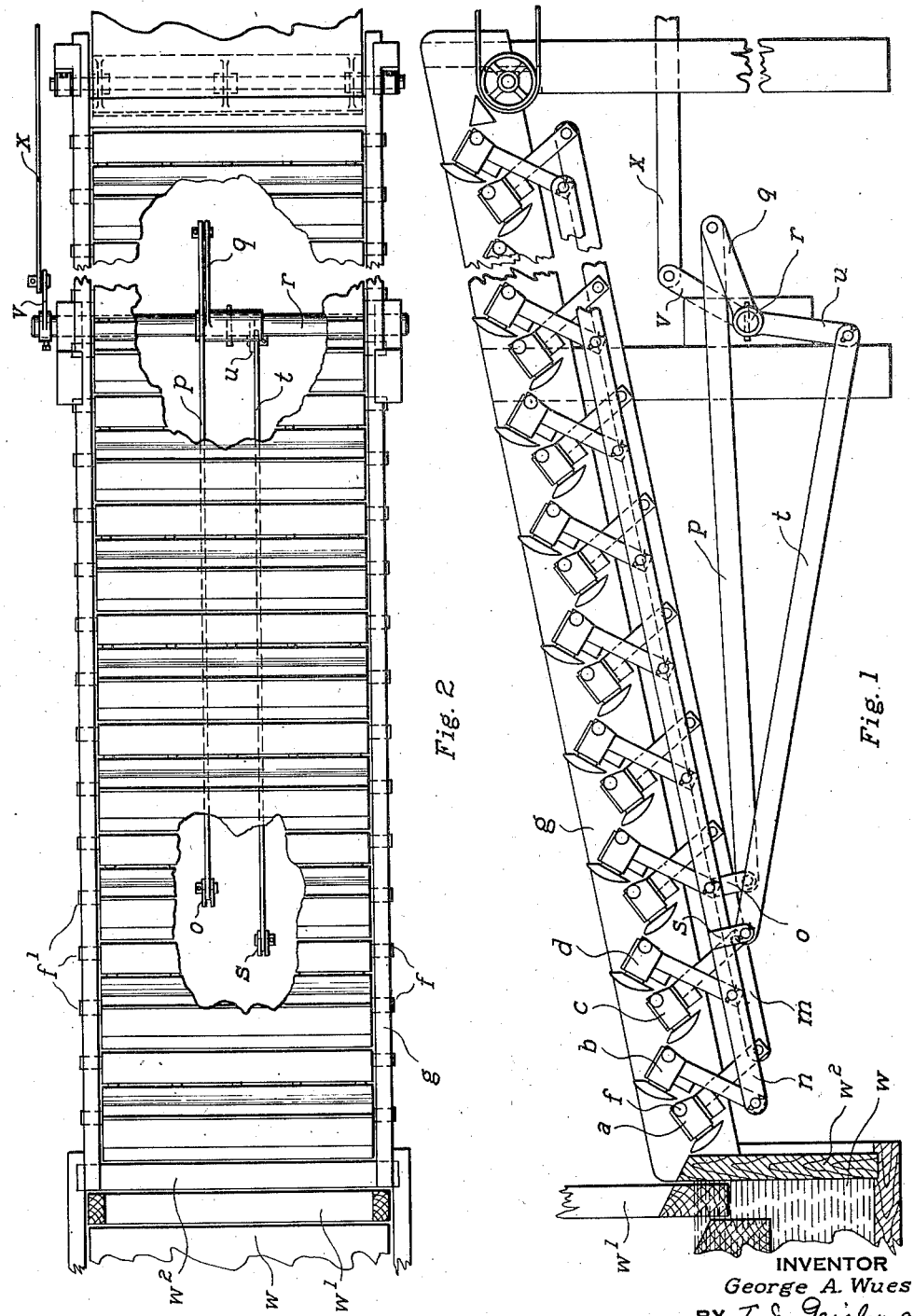
INVENTOR
George A. Wuest
BY T. J. Geisler and
F. R. Geisler
ATTORNEYS Jan. 17, 1939.  G. A. WUEST  2,144,281
FRUIT DRAINING AND DRYING APPARATUS
Filed Aug. 24, 1936  2 Sheets-Sheet 2
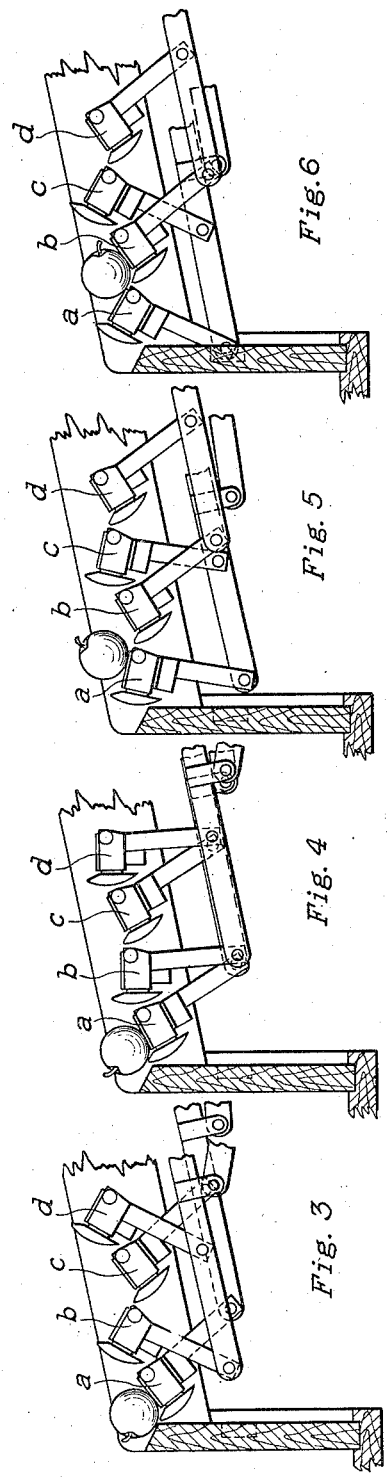
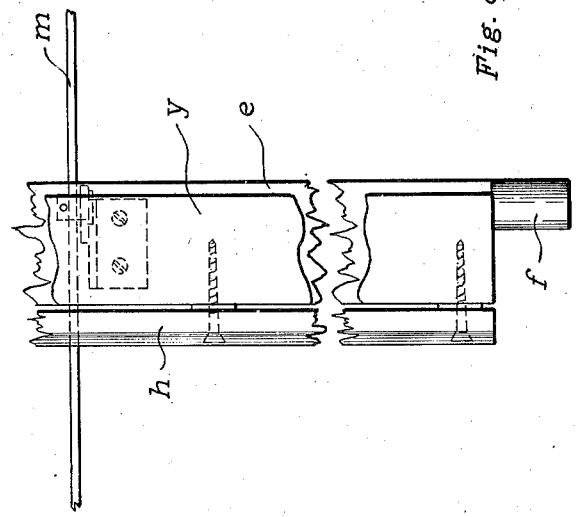
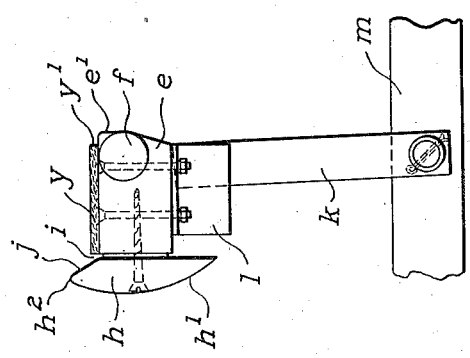
INVENTOR
George A. Wuest
BY T. J. Geisler and
J. H. Geisler.
ATTORNEYS Patented Jan. 17, 1939

2,144,281

UNITED STATES PATENT OFFICE 2,144,281

FRUIT DRAINING AND DRYING APPARATUS

George A. Wuest, Hood River, Oreg.

Application August 24, 1936, Serial No. 97,651

12 Claims. (Cl. 34—1)

My invention relates to the washing of fruit which has been sprayed. Since certain fruits, for example apples, have to be sprayed with a poisonous solution, while growing, in order to protect them against insects, it is necessary that this spray be washed off before the fruit can be marketed. This washing I prefer to do by the aid of the apparatus described in my Letters Patent No. 1,951,046, dated March 13, 1934, the washing being accomplished by sousing the fruit in a tank of water. After such washing the adhering moisture must be drained from the fruit, and the fruit dried as rapidly as possible.

My present invention concerns the draining and drying section of the apparatus. Since this draining and drying section obviously requires moving parts onto which the fruit is delivered, and by which the fruit is moved forward step by step, and simultaneously lifted to the level of the sorting table, which for convenience of the work is preferably arranged higher than the washing section; and since the fruit is easily bruised by impact with moving parts of the drying section, it is essential that all rough handling, and all possible bruising of the fruit, during its passage over the drying section be avoided.

The object of my invention is to provide a draining and drying apparatus, or a drying and draining section, interposed between the washing section and the sorting table of the apparatus; this draining and drying section to be composed of a series of cooperating, rocking units, the rocking of which relatively to each other is so timed that the fruit will be rolled over and along the draining and drying section units in consecutive steps, from the receiving end to the discharge end of this draining and drying section, and finally onto the sorting table.

In order to accomplish such action by my invention, the rocking of one of two adjacent drying units is cooperatively delayed, that is the rocking of this unit is over a shorter arc than the rocking of the adjacent cooperating unit, as hereinafter described. This relative rocking I accomplish by timing the cooperating motion-transmitting elements connecting said units, respectively, with the source of motion.

A further feature of my invention is so to arrange the fruit carrying surfaces of said units as to simulate a cup; in other words, adapting said surfaces to prevent the backward roll of the fruit. Preferably for this purpose I provide a protrusion or abutment at the rear end of said carrying surface of each unit against which the fruit rests and is thus prevented from rolling backward.

Furthermore, I construct this abutment in the form of an abutment head spaced slightly from the body of the unit so as to provide a crevice thru which moisture adhering to the fruit may drain.

A still further object of my invention is to facilitate and promote the drying of the fruit while reposed on said units, while being rolled forwardly from one unit to the other thereof.

This feature of my draining and drying apparatus I accomplish by covering the fruit-carrying surface of the units with a resilient absorbent material—for example sponge rubber—and by providing a break in the continuity of said absorbent surface between the forward end thereof and the next forward unit; in other words, having the strip of absorbent material terminate—say a quarter of an inch—from the forward edge of the fruit carrying surface of the unit. Thus the moisture adhering to the fruit will have an opportunity to drain off, whereas, if said absorbent material were substantially continuous from one unit to the next forward unit, the absorbent material would become more or less saturated and its efficiency as a means for removing moisture from the fruit by absorption would be materially lessened.

The details of construction of my draining and drying apparatus, and the operation thereof are hereinafter fully described with reference to the acompanying drawings.

In the drawings:

Fig. 1 is a side elevation, more or less diagrammatic, of my draining and drying apparatus, with one of the side supporting elements removed, the receiving end of which is shown as connected to the washing apparatus, and the forward end is assumed to lead to a sorting table, not shown;

Fig. 2 is a top view, with parts broken away so as to illustrate in part the operating means of the moving parts of my apparatus;

Figs. 3 to 6, inclusive, illustrate, diagrammatically, the relative phases of cooperative action of two adjacent fruit carrying units of my apparatus in completing one-half cycle of motion of the units, as follows:

Fig. 3 shows the first or initial relative positions of adjacent units at the receiving end of my drying and draining apparatus;

Fig. 4 shows the second phase of these units;

Fig. 5 shows the third phase of action of these units; as shown here, the unit on which the fruit until now has been reposing is being tilted sufficiently to roll the fruit onto the next forward unit, while the latter is being lowered to its receiving position;

Fig. 6 shows the fourth and final phase of action of these units in which they again form a pocket into which the fruit rolls, the cycle of relative motions of two adjacent units being now completed. The said half-cycle is then repeated, thus advancing the fruit forward step by step and incidentally lifting the same to a higher level until its discharge from the drying apparatus onto the sorting table;

Fig. 7 shows a side elevation of one of said units and part of the means for rocking the same; and Fig. 8 is a fragmentary top view of one of said units.

Referring to Fig. 1: My draining and drying apparatus comprises a series of adjacent, rockable fruit carrying units $a$, $b$, $c$, $d$, etc., which in a combined fruit washer and drier extend from the washing section $w$ to the sorting section (not shown).

The construction of each fruit carrying unit is shown by Figs. 7 and 8. Each unit consists of a body or bar $e$ having a flat upper fruit carrying face and provided with an integral stub shaft $f$, $f'$ at each end which is pivotally mounted in the sides of a supporting frame $g$ (Figs. 1 and 2).

To the receiving side of the body or bar $e$ is attached an abutment head $h$ whose outer face $h'$ is curved so that while the unit is moving from one position to another this head will not interfere with the adjacent unit. This head $h$ is attached to the body $e$ by any convenient means, but preferably in such manner as to leave a drainage slot $i$ (Fig. 7) between the head $h$ and the body $e$. The top $j$ of the head $h$ projects above said upper face of the bar $e$ so as to provide an abutment for the fruit carried by the unit, that is, holding the fruit rolled onto the unit while in receiving position until the unit has moved into discharging position. The inner face of said projecting abutment is inclined so as to facilitate the rolling of the fruit from one unit on the adjacent forward unit and prevent its rolling back. Without such abutment or similarly functioning means the rocking of the fruit carrying units $a$, $b$, $c$, $d$, etc. would be incapable of advancing the fruit thru the draining and drying apparatus. Especially would this be true if the fruit had to be advanced along an inclined path to the fruit sorting table. To the under side of the body $e$ is fastened an arm $k$ by means of a bracket $l$; and the arms $k$ of the series of alternate units, $a$, $c$, etc., and $b$, $d$, etc., are respectively connected to bars $m$ and $n$. To the bar $m$ is attached an arm $o$ which is connected by a pitman rod $p$ with the crank arm $q$ of the rocker shaft $r$; and to the bar $n$ is attached an arm $s$, which is connected by a similar pitman rod $t$ with the crank arm $u$ of said rocker shaft $r$. The rocker shaft $r$ further has a crank arm $v$ which is connected by a rod $x$ with the prime mover (not shown).

The upper surface of the body $e$ of each unit is covered with a strip of absorbent resilient material $y$, which may be sponge rubber. The forward end $y'$ of this strip is spaced slightly from the forward edge $e'$ of the top surface of the body $e$ so as to provide a drainage crevice of approximately ¼ inch between the forward edge $y'$ of the strip $y$ and the edge $e'$ of the body $e$; in that way assuring that the moisture drained from the fruit will not be carried over to the next fruit carrying unit. This is quite important, as I have discovered by my experiments.

In the initial position the alternate fruit-carrying units $a$, $c$, etc., at the receiving end of the apparatus will be arranged so as to constitute a fruit-receiving pocket (see Fig. 3).

The successive phases of the cooperative actions of the adjacent fruit-carrying, draining, drying and advancing units $a$, $b$, $c$, $d$, etc., are illustrated by Figs. 3, 4, 5 and 6. In Fig. 3 unit $a$ is positioned to receive the fruit from the washing section. In Fig. 4 unit $a$ is being rocked and its body $e$ raised, while unit $b$ is being rocked and lowered. In Fig. 5 unit $a$ is almost tilted sufficiently to roll the fruit onto adjacent unit $b$, which action is completed in the phase illustrated by Fig. 6. Unit $b$ (Fig. 6) is now positioned similarly as unit $a$ in Fig. 3, and the described cooperative actions of adjacent units $a$ and $b$ are now repeated by the adjacent units $b$ and $c$, and so on. In this manner rows of the fruit are passed from carrying unit to carrying unit thru the draining and drying section, and finally to the sorting table (not shown).

The described cooperative action of adjacent units $a$ and $b$, and $b$ and $c$, is accomplished by the relative positioning of the crank-arms $u$ and $q$, and this is arranged relatively to the incline of the draining and drying section from the washing section to sorting table.

The relative movement of the units $a$, $b$, $c$, $d$, etc., is so timed that the fruit, in its passage thru the apparatus, does not come into violent contact with any edges which would bruise or otherwise injure the fruit, the motion of said units having an action similar to that of human hands transferring, in a rolling manner, a piece of fruit from one hand to the other. When the fruit is rolled from the top inclined surface of one unit to the succeeding unit the upper edge $h2$ of the abutment head $h$ of the latter will be in a position slightly below the surface of the former, as shown in Fig. 6, thus preventing the fruit from striking the edge $h2$.

Referring to Fig. 1, it will be apparent that as the arms $u$ and $q$ are moved in a counter-clockwise direction, the lengthwise movement of the link $t$ will be considerably greater than the lengthwise movement of the link $p$, because the pivotal connection with the arm $u$ moves almost entirely horizontally while the pivotal connection with arm $q$ travels nearly vertically. The resulting action of the units may be seen by comparing the positions of the units $a$, $b$, $c$, $d$ illustrated in Figs. 3 and 4. It will be noted that while the unit $b$ has moved a considerable distance downwardly (Fig. 4) the unit $a$ has moved only slightly from its initial position. Thus the delayed action of the alternate elements $a$, $c$, etc., allows the alternate elements $b$, $d$, etc., to assume the position shown in Fig. 5, whereupon the fruit is about to roll into the shallow cup thus formed. From this point the arm $q$ moves laterally faster than the arm $u$ causing the opposite effect to that above described. The elements $a$, $c$, etc., are now moving relatively faster than the elements $b$, $d$, etc., as shown in Fig. 6, the previously described delayed motion of the elements $a$, $c$, being repeated now by elements $b$, $d$.

The alternate retarding and accelerating action of the units as described renders my apparatus highly satisfactory in the elevating and drying of fruit; in fact, actual tests have proven that ripe peaches, which are very susceptible to bruises, can be handled in my drying apparatus without damage.

Fruit is transferred from the washing section $w$ by the lifting element $w'$ which raises the fruit to the inclined top surface of the tank end $w2$ from whence it (as described in my Patent No. 1,951,046, above referred to) rolls onto and is raised by the unit $a$ as shown in Fig. 1.

Without limiting myself to the details of construction described not essential to the principle of operation of my invention, I claim:

1. A fruit drying apparatus comprising a supporting frame, a series of adjacent cooperating drying units transversely pivoted in said frame, means cooperatively rocking said units and so timed that the movements of said units, respectively, are alternately, relatively, accelerated and retarded, whereby the fruit carrying surfaces of said units initially form a fruit receiving pocket and then by cooperative undulating motions carry the fruit from unit to unit thru the drying apparatus, the fruit-carrying face of each unit provided with an abutment preventing backward roll of the fruit, said fruit-carrying surface provided with moisture draining means at the forward side of said abutment.

2. The apparatus set forth by claim 1 in which the abutment therein described is spaced from the body of the unit so as to provide an intermediate draining crevice.

3. The combination described by claim 1 with the fruit carrying surface of each unit covered with a resilient absorptive strip, the forward edge of said strip not extending to the forward edge of said surface, and thus providing a draining space between adjacent units.

4. In a fruit drying apparatus a supporting frame, a series of adjacent, cooperating drying units having flat fruit-carrying faces and provided at one side with a fruit-holding abutment, means cooperatively rocking said units and so timed that the movements of said units, respectively, are alternately, relatively accelerated and retarded, whereby the fruit-carrying faces of said units initially form a fruit-receiving pocket and then by cooperative undulation carry the fruit from unit to unit thru the drying apparatus.

5. The combination described by claim 4 with the fruit-carrying faces of the units provided with a moisture draining aperture at the forward side of the abutment.

6. The combination described by claim 4 in which the abutment therein described is spaced from the body of the unit to provide an intermediate draining crevice.

7. The combination described by claim 4 with the fruit-carrying faces of the units provided with a moisture draining aperture at the forward side of the abutment, and the inner face of said abutment is inclined outwardly.

8. The combination described by claim 4 in which the outer face of said abutment is convex and adapted to permit the close arrangement of the units with one another without interference with each other while being rocked.

9. The combination described by claim 4 with the inner face of said abutment inclined outwardly and the outer face thereof is convex and adapted to permit the close arrangement of the units with one another without interference with each other while being rocked.

10. The combination described by claim 4 with said fruit-carrying faces provided with a strip of absorbent resilient material whose forward end does not extend to the forward edge of said upper face, to provide a draining space between adjacent units.

11. The combination described by claim 4 with said fruit-carrying faces provided with a moisture draining aperture at the forward side of said abutment, and said fruit-carrying faces further provided with a strip of absorbent resilient material whose forward end does not extend to the forward edge of said upper face, to provide a draining space between adjacent units.

12. The combination described by claim 4 with said fruit-carrying faces provided with a moisture draining aperture at the forward side of said abutment, with the inner face of said abutment inclined outwardly, and the outer face of said abutment being convex and adapted to permit the close arrangement of the units with one another without interference with each other while being rocked.

GEORGE A. WUEST.